Dec. 10, 1929.   R. B. LINCOLN   1,739,155
ELECTRIC TOASTER
Filed Jan. 16, 1928   2 Sheets-Sheet 1
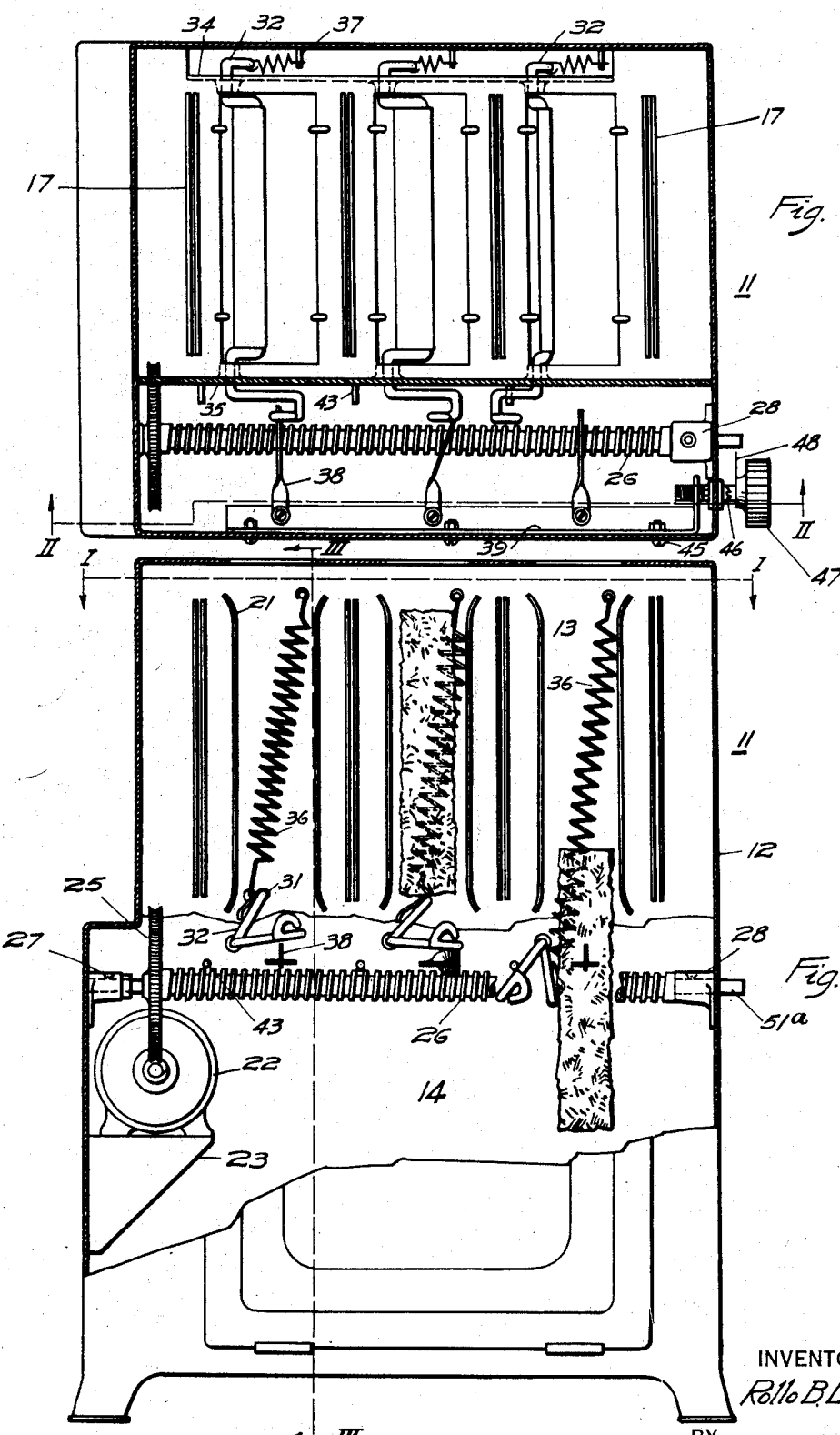
INVENTOR
Rollo B. Lincoln.
BY
Chesley S. Carr
ATTORNEY Dec. 10, 1929.     R. B. LINCOLN     1,739,155
ELECTRIC TOASTER
Filed Jan. 16, 1928     2 Sheets-Sheet 2
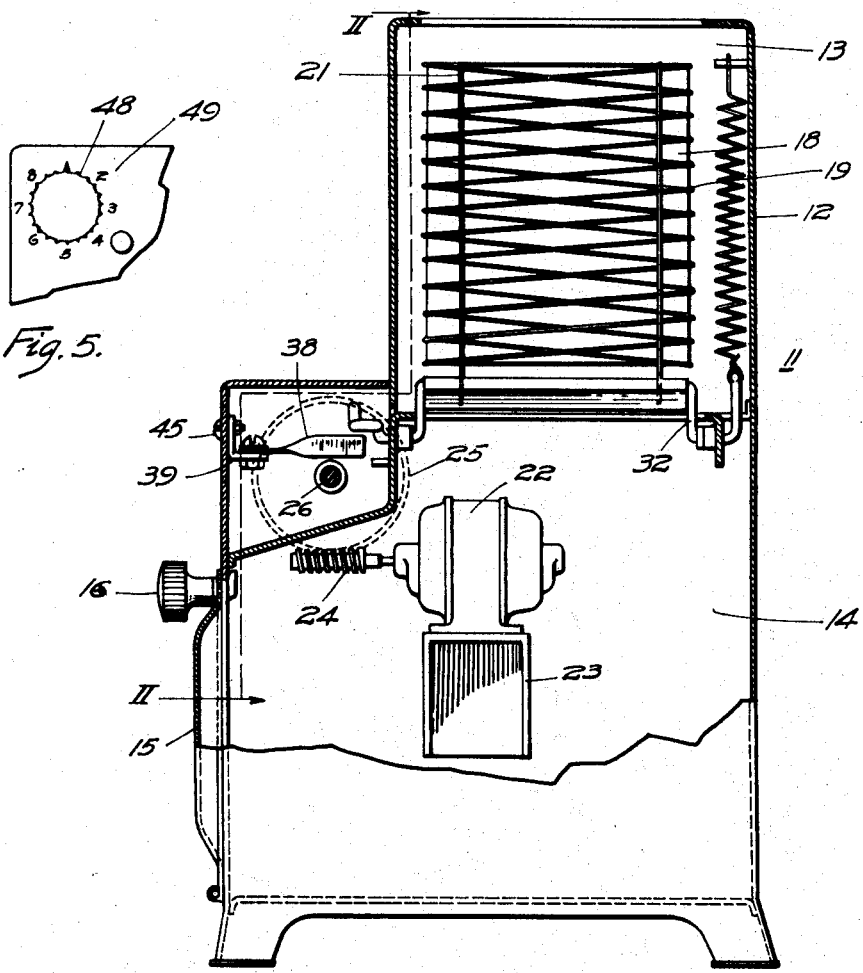
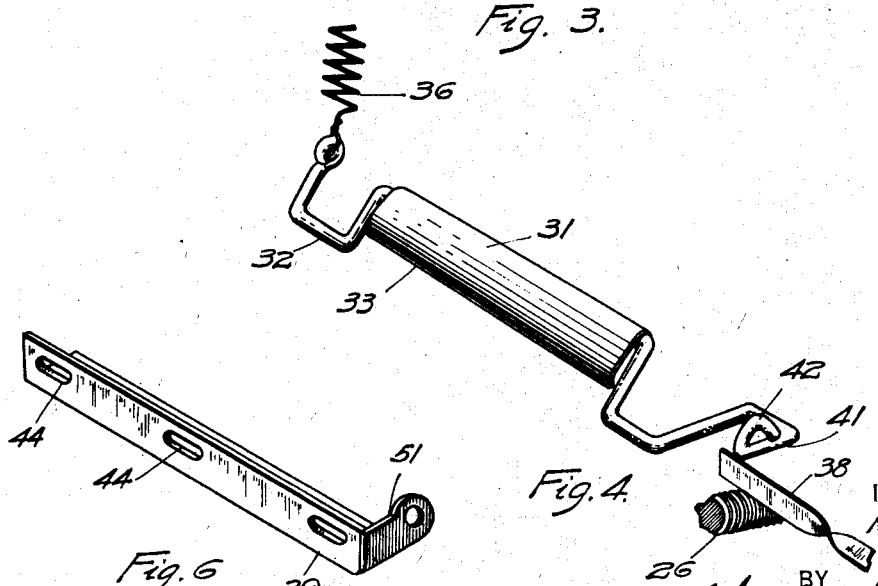
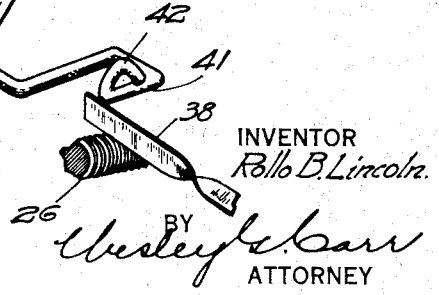
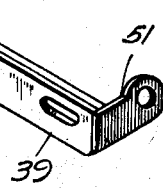
INVENTOR
Rollo B. Lincoln.
BY
ATTORNEY Patented Dec. 10, 1929

1,739,155

UNITED STATES PATENT OFFICE

ROLLO B. LINCOLN, OF WILKINSBURG, PENNSYLVANIA, ASSIGNOR TO WESTINGHOUSE ELECTRIC & MANUFACTURING COMPANY, A CORPORATION OF PENNSYLVANIA

ELECTRIC TOASTER

Application filed January 16, 1928. Serial No. 246,965.

My invention relates to toasters and particularly to automatic electric toasters.

An object of my invention is to provide a relatively simple toaster that shall embody means for supporting a slice of bread between spaced heating elements for a predetermined length of time.

Another object of my invention is to provide a toaster embodying a time mechanism operatively engaged by a bread-slice support only when a slice of bread is placed on the support and adapted to hold the slice in toasting relation to the heating elements for a predetermined length of time only, after which movement of the slice support permits the slice to drop into a storage chamber.

In practicing my invention, I provide a casing having a plurality of heating elements mounted therein and spaced apart suitable distances to permit of locating therebetween slices of bread to be toasted.

A pivotally mounted bread-slice support is provided for each space between the heating elements and is normally yieldingly held in a predetermined position.

A timing mechanism, embodying a motor and a continuously rotatable shaft driven thereby, is provided.

A plurality of springs are provided to extend above the continuously rotatable shaft and below a portion of the bread-slice support.

When a slice of bread is located on a support, the latter will be so moved as to cause the spring to engage the shaft, whereby the spring is slowly moved laterally of the support until disengaged therefrom, the weight of the slice of bread causing further turning movement of the support to permit the slice of bread to fall into a storage compartment below the heating elements. A resilient element effects return of the support to its normal position.

In the drawings,

Figure 1 is a view in horizontal section through the upper portion of a device embodying my invention, taken on the line I—I of Fig. 2, Fig. 2 is a view, in vertical section taken on line II—II of Fig. 1, Fig. 3 is a view, partially in side elevation and partially in section, on the line III—III of Fig. 2, Fig. 4 is a view, in perspective, of certain elements of the device embodying my invention, Fig. 5 is a view, in front elevation, of a portion of the device showing a timing scale, and Fig. 6 is a view, in perspective, of one element of the device embodying my invention.

A toaster 11 comprises a suitable casing 12 of substantially rectangular shape and comprising, generally, an upper heating compartment 13 and a lower compartment 14, in which is located a timing mechanism and which serves also as a storage chamber. The casing 12 may be made of any suitable or desired, material, such as sheet metal, and of any suitable or desired shape suitable for the intended purpose and for surrounding the elements located therein.

The storage compartment 14 is provided with a door 15 having a knob 16 at the top thereof to permit of access to the storage compartment for purposes of adjusting the timing mechanism and for removing the toasted slices of bread. The door 15 may constitute the front wall of a drawer, into which the toasted slices of bread may fall.

Spaced heating elements 17 of any suitable or desired type are located in the upper portion of the casing. Each heating element is here shown as embodying a plate 18 of electric insulating material, such as mica, and a resistor wire 19 wound thereon.

Guide wires 21 are provided on each side of the heating elements, in order to insure that a slice of bread located between adjacent elements shall be spaced therefrom sufficiently to insure against burning the bread during the toasting operation. The guides also insure uniform toasting by holding the slices of bread in uniformly spaced relation to the adjacent heating elements.

I have shown no specific means for supporting the heating elements as this features no part of my invention. Since any suitable supporting structure may be employed, I have deemed it unnecessary to illustrate and describe the same in detail. Further, while I have illustrated an electric heating element, I do not desire to be limited thereto, as any other suitable heating means may be employed.

A timing mechanism for determining the length of time during which a slice of bread shall be located in toasting relation to the heating elements is located in the storage chamber 14, at one side thereof, and embodies an electric motor 22 mounted on a suitable supporting bracket 23 secured to the side wall of the casing 12.

The motor shaft is provided with a portion 24 having a worm thread thereon, to operatively engage a worm gear wheel 25 which is, in turn, mounted on a screw-threaded shaft 26. The ends of the shaft 26 are supported in suitable bearing members 27 and 28 which are secured against the side walls of the casing 12. While I have illustrated relatively coarse screw threads on the shaft 26, I do not wish it to be understood that I necessarily employ these in actual practice. I may employ a much finer thread than that shown.

A plurality of bread-slice supporting members 31 are provided, each of these embodying a wire 32 bent to substantially W-shape, the intermediate portion thereof being long enough to receive a plate 33 of sheet metal, one edge of which is bent around the wire 32 and the other edge of which is bent slightly out of the main plane thereof. Each of the wires 32 is pivotally supported by a plurality of spaced bearing members consisting, respectively, of sheet-metal plates 34 and 35 extending across the top of the storage chamber and having their ends suitably secured to either the side walls or to the rear wall of the casing.

Helical springs 36 are provided adjacent to the rear wall of the casing 12 to extend substantially vertically, the upper end of each spring being connected to a pin 37 secured to the wall, and the lower end thereof being connected to a rear extension of the wire 32, substantially as shown in detail in Fig. 4 of the drawings. The strength of the respective springs 36 is made such that the bread-slice support 31 will be located in substantially the position shown in the left-hand side of Fig. 2, as long as no slice of bread is located on the support. However, as soon as a slice of bread is dropped through a suitable opening in the upper part of the casing, the bread-slice support will be turned to the position shown by the intermediate support illustrated in Fig. 2 of the drawings.

A plurality of leaf springs 38 extend horizontally above the shaft 26 and have their forward ends mounted on a strip of metal 39 secured against the front wall of the casing. Each of the springs 38 is bent intermediate its ends so that the plane of one portion thereof is substantially at right angles to the plane of the other portion, as is shown more particularly in Fig. 1 of the drawings. The forward portion of the wire 32 is bent to substantially the shape show at 41 in Fig. 4 of the drawing, the initial portion extending longitudinally of the support then being bent backwards at right angles and then into a return-bent end portion 42.

As is shown more particularly by the bread-slice support 31 shown at the left-hand of Fig. 2, the portion 41 will be out of engagement with the spring 38 so long as no slice of bread is located on the support. However, when a slice of bread is dropped thereon, the support is turned on its pivotal supports, engages the one end of the spring at its edge and bends it downwardly until the lower edge fits into the groove on the shaft 26. The free end of the spring is caused to travel longitudinally of the shaft, substantially as shown in the central spring in Fig. 1, until it is disengaged from the portion 41 of the bread-slice support. When this disengagement occurs, the weight of the slice of bread on the support causes it to turn still further in its bearings until it takes the position shown for the right-hand support illustrated in Fig. 2 of the drawings, whereby the slice of bread is permitted to drop downwardly into the storage compartment 14.

As soon as the slice of bread has dropped clear of the support 31, the latter is returned to its initial or normal position by its associated spring 36, when it will again be in the position shown by the left-hand support 31, as illustrated in Fig. 2.

The spring 38 will, of course, have a tendency to return very quickly to its initial straightened position and may be engaged by the return-bent portion 42 of the bread-slice support when the same is being returned by the spring 36 to its initial position, whereby the spring 38 is bent to permit of the return of the bread-slice support to its initial position. Pins 43 may be provided, one for each of the bread-slice supports, to limit the turning movement thereof in their respective bearings.

The supporting strip 39 may be of angular shape in lateral section, one side thereof being provided with elongated openings 44 through which extend securing screws 45. The construction is such that the support 39 may be moved longitudinally of its length to vary the position of the springs 38 relatively to the portion 41 of the bread-slice supports. This longitudinal movement is effected by a screw 46 having a knob 47 at its outer end, together with a pointer 48 moving in front of a scale 49. The inner screw threaded end of the screw 46 engages a bent-over portion 51 of the member 39. A turning movement of the knob and screw will effect movement of the spring support 39 and of the springs 38 relatively to the bread-slice support.

If it is desired to provide a plurality of toasters in side-by-side relation, any additional toasters may not be provided with a driving motor, but may be mechanically coupled to the first toaster. For this purpose, the shaft 26 is extended through one wall of the casing, as shown at 51ª in Fig. 2, so that a suitable coupling may be employed to connect the shaft extensions.

The device embodying my invention thus provides a relatively simple and efficient toaster embodying a timing mechanism comprising a constantly rotating element, such as a shaft, and a plurality of pivotally mounted bread-slice supports normally yieldingly held out of operative engagement with the timing mechanism and caused to operatively engage the same by a slice of bread placed on the support.

The support is then held in such position as to maintain a slice of bread in toasting relation to the heating element or elements until such time as it shall have been properly toasted, after which the toasted slice is permitted to drop therefrom into a storage compartment, the bread-slice support being moved quickly to such position as to permit the slice to drop therefrom. Resilient means then effect the return of the bread-slice support to its initial position.

The means shown for varying the time of a toasting operation may be supplemented by varying the motor speed in any well known manner.

Various modifications may be made in the device embodying my invention without departing from the spirit and scope thereof, and I desire, therefore, that only such limitations shall be placed thereon as are imposed by the prior art or are set forth in the appended claims.

I claim as my invention:

1. In a toaster having a plurality of spaced electric heating elements and a continuously operative shaft, in combination, a pivotally mounted bread-slice supporting means normally yieldingly held out of operative engagement with the shaft, means operatively connecting the slice-supporting means with the shaft when a slice of bread is located on the supporting means, said connecting means being effective to permit the slice-supporting means to turn on its pivotal mounting and drop the slice.

2. In a toaster having a plurality of spaced electric heating elements, a pivotally mounted bread-slice support and a motor-driven continuously operative shaft, in combination, means mechanically operatively connecting the slice support and the shaft when a slice of bread is placed on the slice support, and means operative to permit the slice to be disengaged from its support after a predetermined length of time after initiation of said mechanical connection between the slice support and the shaft.

3. In a toaster having a plurality of spaced electric heating elements, a motor-driven rotatable shaft, and a bread-slice supporting means normally yieldingly held out of operative engagement with the shaft, in combination, means operatively associated with the slice support for mechanically operatively connecting it to the shaft, and for maintaining it in position to support the slice of bread for a predetermined length of time only after such operative connection.

4. In a toaster having a plurality of electric heating elements, and a pivotally-mounted bread-slice supporting means, in combination, a motor-driven rotatable shaft, and means for causing said slice-supporting means to be held by the shaft in a position to support a slice of bread placed thereon in toasting position between the heating elements for a predetermined length of time.

5. In a toaster having a plurality of electric heating elements, and a pivotally-mounted bread-slice supporting means, in combination, a motor-driven rotatable shaft, and means for causing said slice-supporting means to be held by the shaft in a position to support a slice of bread placed thereon in toasting position between the heating elements for a predetermined length of time, and thereafter to permit a slice of bread initially placed thereon to drop therefrom.

6. In a toaster having a plurailty of heating elements, and a motor-driven rotatable shaft, in combination, a pivotally mounted bread-slice supporting means resiliently held out of operative engagement with the shaft, and means effective upon placing a slice of bread on the slice support to operatively connect the support to the shaft and hold it in position to support the slice between the heating elements, said connecting means being operative after a predetermined time to permit the support to move out from under the slice.

7. In a toaster having a plurality of heating elements, a screw threaded shaft, and a motor for rotating said shaft, in combination, a pivotally mounted slice support, a spring for normally holding the slice support out of operative engagement with the shaft, a leaf spring extending laterally above the shaft and means on said support for causing the spring to engage said shaft and maintain the slice supoprt in position to hold a slice of bread between the heating elements for a predetermined length of time and thereafter to permit the support to turn to drop the slice.

8. In a toaster having a heating element and a timing mechanism, in combination, a bread-slice support normally out of operative engagement with the timing mechanism and caused to operatively engage the latter when a slice of bread is placed on the support and effective to support the slice in toasting relation to the heating element for a predetermined length of time only.

9. In a toaster having a heating element and a timing mechanism embodying a rotatable screw threaded shaft, in combination, a bread-slice support, means for mechanically operatively connecting the slice support and the rotatable shaft when a slice of bread is placed on the support, said connecting means being effective to hold the slice support in position to support a slice in toasting relation to the heating element for a predetermined length of time and to then permit the toasted slice to move the support to permit it to drop therefrom, and resilient means for returning the slice support to its initial position.

10. In a toaster having a plurality of heating elements, a screw threaded shaft, and a motor for rotating said shaft, in combination, a pivotally mounted slice support, a spring for normally holding the slice support out of operative engagement with the shaft, a leaf spring extending laterally above the shaft, means on said support for causing the spring to engage said shaft and maintain the slice support in position to hold a slice of bread between the heating elements for a predetermined length of time and thereafter to permit the support to turn to drop the slice, and means for varying the initial position of said spring relatively to the bread-slice support.

In testimony whereof, I have hereunto subscribed my name this 12th day of January, 1928.

ROLLO B. LINCOLN.